United States Patent
Sughrue, II et al.

[11] Patent Number: 5,946,480
[45] Date of Patent: Aug. 31, 1999

[54] METHOD AND APPARATUS FOR COMPUTER SIMULATION OF PENTANE ISOMERIZATION REACTIONS

[75] Inventors: Edward L. Sughrue, II; Raul Adarme; Fan-Nan Lin, all of Bartlesville, Okla.

[73] Assignee: Phillips Petroleum Company, Bartlesville, Okla.

[21] Appl. No.: 08/000,077

[22] Filed: Jan. 4, 1993

[51] Int. Cl.[6] .................................... G06F 3/00
[52] U.S. Cl. ................ 395/500.23; 395/500.33
[58] Field of Search ............................. 395/500

[56] References Cited

U.S. PATENT DOCUMENTS 3,919,720  11/1975  Alliston ................................ 364/140
4,834,866   5/1989  Schmidt ................................ 208/65
4,982,382   1/1991  Dablain ................................ 367/73

OTHER PUBLICATIONS

Petroleum Software, Penwell Publishing Co. p. 102, no date provided.
Culfaz and Akyurtlu Optimization of an η–pentane Isomerization Reactor, 1984, pp. 39–48.

*Primary Examiner*—Richard L. Ellis
*Attorney, Agent, or Firm*—George E. Bogatie

[57] ABSTRACT

A well reasoned steady state model for simulation of pentane isomerization in a long tubular reactor predicts important reaction variables such as feed conversion, product yields, temperature and pressure. The predictions are based on inputs including feed flowrates, composition, temperature and pressure. The model includes a set of differential equations for component concentrations with respect to axial distance along the reactor, and reaction rate constants expressed in terms of physical properties. A method of programming a computer for simulating the reaction is disclosed.

17 Claims, 9 Drawing Sheets

PENTANE ISOMERIZATION REACTOR MODEL
JAN 4, 1992

TEMPERATURE °F

INLET 512.0

DELTA T °F
33.7

BOT 545.7

FEED FLOWRATE

HYDROCARBONS (BPH)
RECYCLE    FRESH
190.9      414.2

HYDROGEN (MSCFD)
RECYCLE    MAKEUP
37000.     1899.9

CATALYST BED
HEIGHT (FT)
13.2

TOTAL PRESSURE (PSIG)
500.0

H2 PARTIAL PRESSURE
INLET   1.7

H2/HYDROCARBON RATIO
2.017

PRODUCT PROPERTIES

NC5 CONVERSION     53.583

% C5 TO LIGHTS      2.892

PRODUCT RATIO       56.1

F1HELP  2OPER  3FEED  4CALIB  5RUN  6  7  8  9FILE  10QUIT

REACTOR CALIBRATION
JAN 4, 1992

FLOWRATES

HYDROCARBON (BPHR)
FRESH     414.2
RECYCLE   190.9

HYDROGEN (MSCFD)
MAKEUP    1899.9
RECYCLE   37000.0

PRODUCT
STAB OVD (MSCFD)  2365.6
SPLT FEED (BPHR)   584.5

FEED TEMP IN(°F)  512.0

FLOWRATES - LB/HR

| COMPONENT | MEASURED FEED | MEASURED PRODUCT | CALCULATED PRODUCT |
|---|---|---|---|
| $H_2$ | 384.2 | 291.1 | 275.6 |
| LIGHTS | 617.1 | 4985.7 | 4168.6 |
| $IC_5$ | 9390.2 | 71178.8 | 71309.2 |
| $NC_5$ | 122788.5 | 56328.3 | 56994.6 |
| TOTAL | 133180.0 | 132783.9 | 132748.0 |

KINETICS:

$C_5$ ISOM       3.618
$C_5$ CRACKING   3.912
LIGHTS           0.640

F1HELP  2OPER  3FEED  4CALIB  5RUN  6  7KINCA  8MATBA  9FILE  10OUIT

METHOD AND APPARATUS FOR COMPUTER SIMULATION OF PENTANE ISOMERIZATION REACTIONS

This invention relates to hydrocarbon processing which increases the octane level of pentane hydrocarbon fractions by isomerization over a catalyst. In one aspect it relates to a method and apparatus for computer simulation of a pentane isomerization reaction carried out in commercial process plant equipment. More specifically it relates to defining a mathematical model based on kinetic chemical reaction mechanism of n-pentane isomerization and using the mathematical model in a computer program for simulating a commercial isomerization reaction.

BACKGROUND OF THE INVENTION

Isomerization processes, which rearrange the molecular form of a hydrocarbon feedstock while minimizing cracking reactions, are well known in the art. While lighter alkane hydrocarbons feedstocks are often subjected to isomerization steps, a most popular form of isomerization is for pentane and heavier hydrocarbons. Impetus for the isomerization of pentane comes from the need to improve the antiknock quality of the lighter portions of gasoline fuel blends. For example, n-pentane having a clear research octane rating of about 62 can be converted to isopentane have a clear research octane rating number of 92. Accordingly, refiners who maximize production of motor fuel will add isomerization steps to counteract restrictions on use of antiknock additives to improve the quality of blending refinery stocks that are suitable for premium grade motor fuels.

A process simulator is useful to refinery operators in a variety of ways. For example, a computer program which simulates current operation of the refinery, provides an important capability. Such a simulator can provide a wealth of information not readily available from control instrumentation. Further it provides this information in a easily understandable form for both the operator and the refinery engineer. Process simulators can be especially useful, for example in planning the catalyst replacement cycle, since the operator can evaluate the impact of replacing the catalyst with fresh, regenerated or a different catalyst at any desired time. He can then determine optimum replacement cycles and plan shut downs accordingly.

It is an object of this invention to develop a mathematical model for a commercial size isomerization unit.

A further object of this invention is to produce a computer program using a mathematical model for closely simulating the isomerization of pentane feedstocks so is to provide guidance to refiners for improving commercial operations.

A more specific object of this invention is to provide a reactor simulator for testing new operating conditions.

Another specific object of this invention is to evaluate at any time the impact of replacing the isomerization catalyst with fresh or a different catalyst.

A still further object of this invention is to provide a simulator for training operators.

SUMMARY OF THE INVENTION

In accordance with the present invention there is provided a computer programmed for simulation of a pentane isomerization reaction according to a prestored mathematical model of the conversion of a hydrocarbon feedstream, when the feedstream is contacted with an isomerization catalyst in the presence of hydrogen in a tubular reactor maintained under isomerization conditions. This simulation presumes a reaction mechanism for forming isopentane and hydrocracking products from a feedstream primarily containing n-pentane where the rate of change of hydrocarbon components in the reactor is depended on physical properties, concentrations, and process conditions. Differential equations based on heat and material balances with respect to the axial distance along the reactor in combination with reaction rate constants define the model. The rate constants, which are expressed in terms of physical laws, are found from commercial data.

Simulating the reaction comprises programming a digital computer to accept initial input data including feed compositions, and flow rates, process conditions and reactor dimensions, and to define at least four concentration variables and a temperature variable in terms of mole flow rates. Then the program proceeds to calculate physical properties including heat capacities, heats of formation, reaction equilibrium constants, isomerization reaction rate constants, cracking rate constants and rates of reaction. Next the program proceeds to define and solve differential equations for concentrations and temperature with respect to distance along the reactor, where the equations are derived from heat and material balances. Finally the program calculates and displays the reactor output conditions and product yields.

Additional objects and advantages of the invention will be apparent from the following detailed description of the preferred embodiment of the invention, as illustrated by the drawings in which:

BRIEF DESCRIPTION OF THE DRAWINGS

FIG. 5 is a screen display panel illustrating data entry and simulation results.

FIG. 6 is a screen display panel illustrating reactor calibration.

DETAILED DESCRIPTION OF A PREFERRED EMBODIMENT

Figure 1:
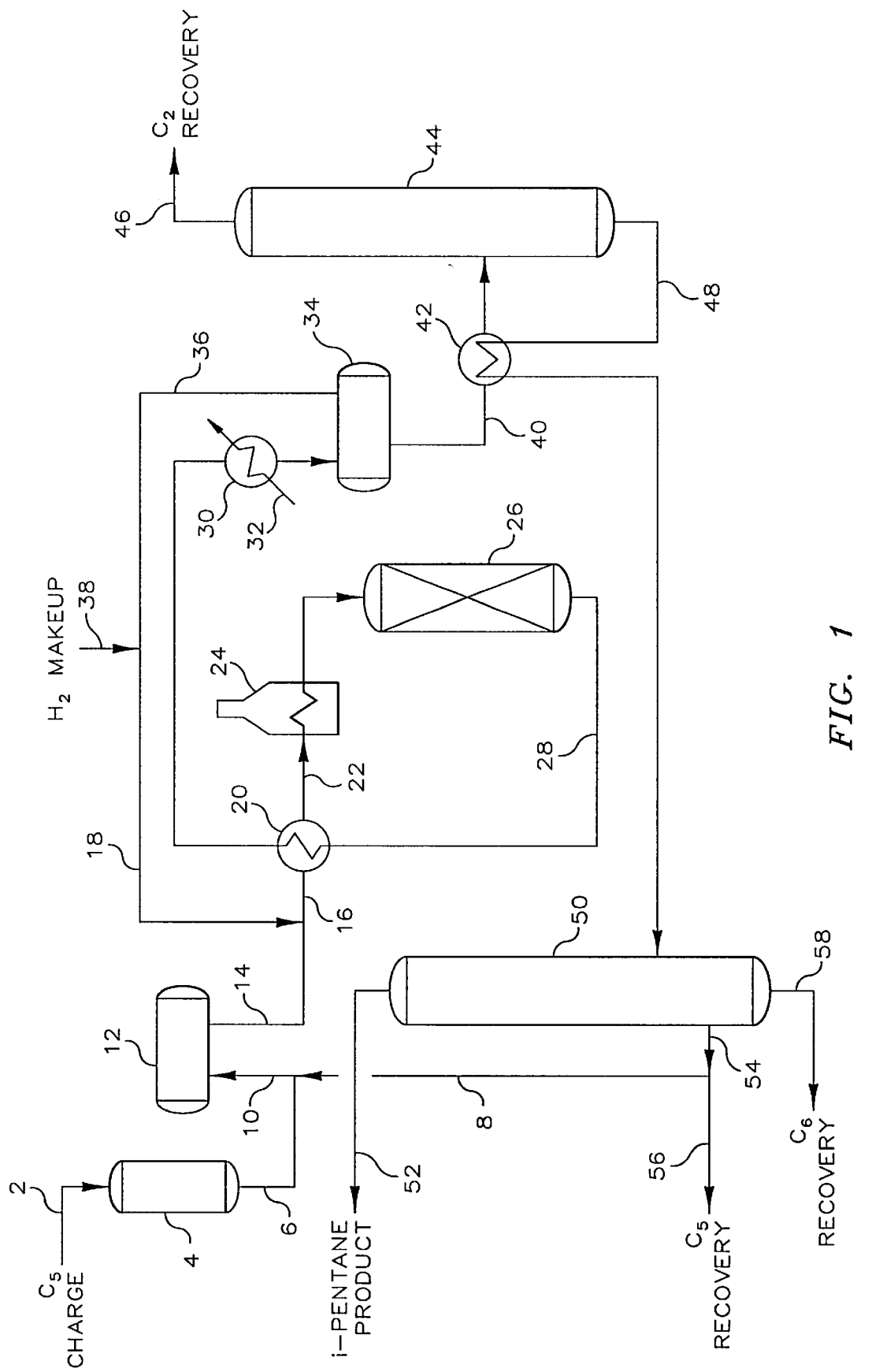
FIG. 1 is a simplified schematic representation of a pentane isomerization process.

FIG. 1 shows the essentials of a typical pentane isomerization process wherein fresh n-pentane feed which can contain lesser amounts of other lighter hydrocarbons such as normal butane, isobutane, $C_3$ and lighter hydrocarbons, is supplied via conduit 2 to a dryer 4. The dried hydrocarbon fresh feed from the dryer 4, withdrawn in conduit 6, is combined in conduit 10 with recycled pentane hydrocarbons supplied via conduit 8, and the combined streams are supplied to the feed drum 12. The feed material withdrawn from feed drum 12, via conduit 14, is combined in conduit 16 with a hydrogen stream flowing in conduit 18. The hydrocarbon and hydrogen mixture flowing in conduit 16, which provide the reactor feed, is preheated in heat exchanger 20 and supplied to the reactor furnace 24 via conduit 22. The heated hydrocarbon and hydrogen mixture is then supplied to reactor 26 where contact with an isomerization catalyst is effected under isomerization conditions. Isomerization reaction products are withdrawn via conduit 28 and cooled in heat exchanger 20 with further cooling achieved in heat exchanger 30 where cooling water is supplied via conduit 32.

In product separator 34 recycle hydrogen is withdrawn via conduit 36 and combined with a makeup hydrogen stream in conduit 38 to form a total hydrogen stream in conduit 18. The reaction product is withdrawn from separator 34 via conduit 40 preheated in exchanger 42 and supplied to stabilizer column 44 where lighter hydrocarbon components are removed via conduit 46. The product is withdrawn from stabilizer column 44 via conduit 48, cooled in a heat exchanger 42 and supplied to the $C_5$ splitter column 50. In splitter column 50 isopentane product is recovered overhead via conduit 52, n-pentane is recovered via conduit 54 and partially recycled via conduit 8. $C_5$ and $C_6$ components are recovered in conduit 56 and 58 respectively.

In accordance with this invention a computer is programmed to simulate a homogenous steady state pentane isomerization reaction in a reactor such as illustrated at 26 in FIG. 1. The reaction to be simulated is carried out in an adiabatic plug flow reactor over a catalyst which is typically a platinum containing isomerization catalyst, and where the reaction conditions of pressure, temperature and velocity are dependent on the particular catalyst used. Equations and constants defining the model are set forth in the discussion of FIG. 3A–3B.

Figure 2:
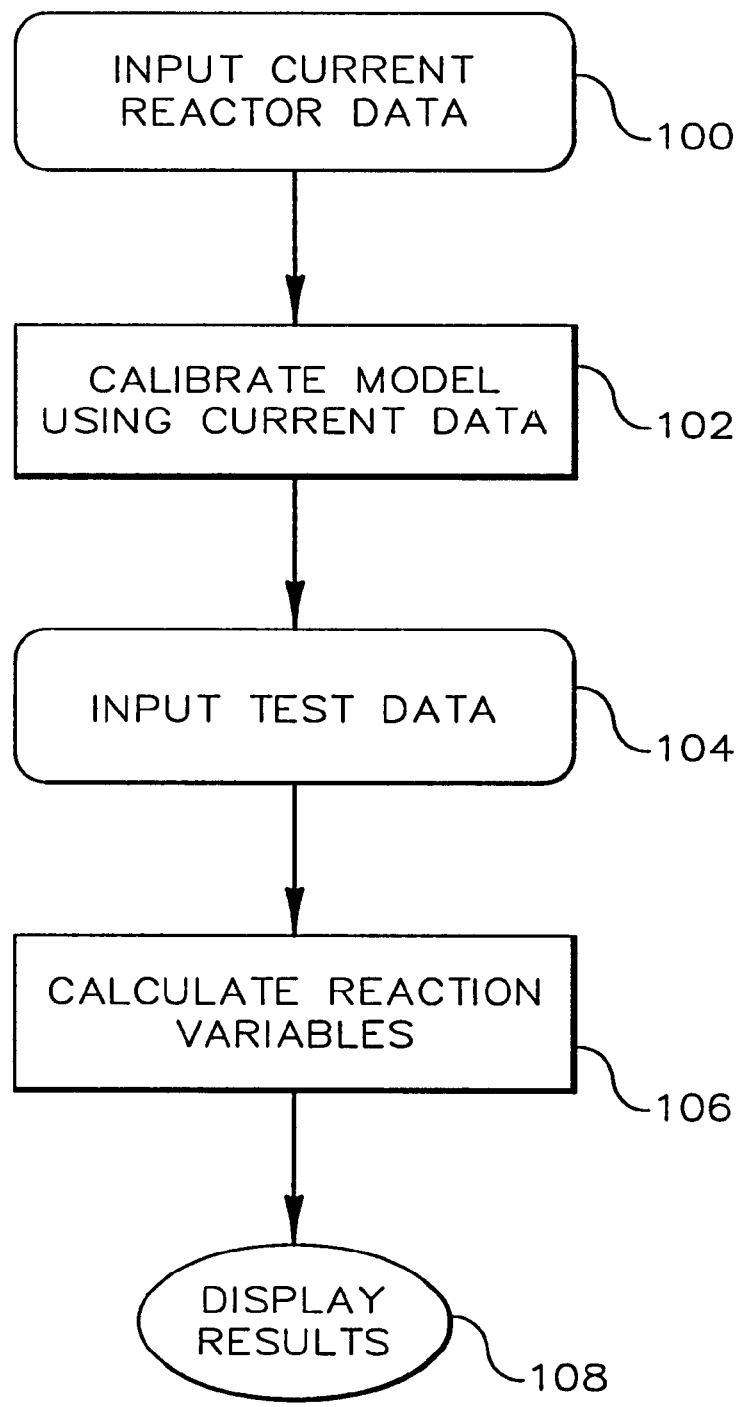
FIG. 2 is an overview flow chart for a reactor simulation.

Referring now to FIG. 2 there is illustrated a flowchart which gives an overview of the procedure used to stimulate pentane isomerization. In a first step 100 actual measured data characterizing reactor input and output variables and reactor conditions is entered into the program. These data, which will typically be reconciled prior to being entered in the program, are used to calibrate the model as illustrated in step 102, by determining isomerization rate and cracking rate constants which are consistent with measured data. The measured data used to calibrate the model is preferably recent data, it may however, include an average for several selected runs. Next in step 104 a set of test data characterizing reactor input variables and reactor conditions, which will generally differ from the measured data used in the calibration step 102 in some desired manner, is entered into the program in step 104. These test data in conjunction with reaction rate constants determined in step 102 are used to calculate reactor output variables as shown in step 106. Results may be displayed in any desired manner, preferably they are displayed as a screen display as illustrated at step 108.

It is should be apparent from the general flowchart of FIG. 2 that variables which typify flows, temperature, pressure, concentration, isomerization rates, cracking rates, heats of reaction, as well as physical properties for the reacting materials will be needed in this simulation program. Variable names which conform to FORTRAN programming standards are given in Table I below for use in the simulation program. The range of values given in Table I is typical for a commercial size reactor.

TABLE I

Nomenclature

| Name | Conduit | Description | Range of Values |
|---|---|---|---|
| Feed Flows | | | |
| BPDAY | 10 | Volume H/C charge flow, BPD | 12,000–24,000 |
| MASFLO | 10 | Mass flow H/C charge, lb/sec | |
| C5MOL | 10 | Molar flow H/C charge, lb-mol/sec | |
| CFLOH2 | 18 | Volume flow of total $H_2$ stream, $ft^3$/sec | |
| CMAKH2 | 38 | Volume flow makeup $H_2$ stream, MSCFD | 500–5,000 |
| CRECH2 | 36 | Volume flow recycle $H_2$ stream, MSCFD | 5,000–25,000 |
| CMOL | 18 | Total molar flow $H_2$ stream, lb-mol/sec | |
| CMOLH2 | 18 | Mol $H_2$ flow component of total $H_2$ stream, lb-mol/sec | |
| CMOLLI | 18 | Mol $C_2$ flow component of total H/C charge, lb-mol/sec | |
| MOLFLO | 16 | Mol flow in reactor feed, lb-mol/sec | |
| HRATIO | 16 | Ratio mol $H_2$/mol n-pentane in H/C charge | |
| Product Properties | | | |
| C5CONV | | Percent n-pentane converted | |
| PRAT | | Product ratio i-pentane/n-pentane | |
| Reactor Conditions/Dimensions | | | |
| SYSPT | | Total system pressure, psia | 200–300 |
| USUBS | | Superficial (on total flow), ft/sec | |
| ALHSV | | Liquid hourly $C_4$ space velocity, lb-feed/lb-cat/hr. | 2–5 |
| TF | | Temperature feed, ° F. | 200–800 |
| Z | | Variable reactor length, ft | — |
| ZMAX | | Reactor length, ft | 5–15 |
| AREA | | Reactor area, $ft^2$ | 2–50 |
| DELTA | | Delta temp, across reactor, ° F. | |
| TOUT | | Outlet temp | 200–800 |
| TO1 | | Inlet temp | |
| PPH2IN | | Partial pressure $H_2$ IN | |
| FPH2OU | | Partial pressure $H_2$ OUT | |

TABLE I-continued

Nomenclature

| Feed Flows | | | Range of |
|---|---|---|---|
| Name | Conduit | Description | Values |

Concentrations

| | | | |
|---|---|---|---|
| FRACI5 | | Mol fraction i-pentane H/C charge | 0.0–.5 |
| FRACC2 | | Mol fraction lights H/C charge | 0.0–0.2 |
| CPURH2 | | Purity of $H_2$ in total $H_2$ stream, percent | 60–100 |
| F(I) | | Index for dependent variables | |
| | | 1 = concentration of n-pentane, mol-fraction | |
| | | 2 = concentration of i-pentane, mol-fraction | |
| | | 3 = temperature, ° F. | |
| | | 4 = concentration of cracked products, mol-fraction | |
| | | 5 = concentration of $H_2$, mol fraction | |
| DFDZ(I) | | Derivative of F(I) w.r.t. axial distance along reactor | |
| CLIN | | Starting mol fraction cracked products | |
| C5IN | | Starting mol fraction n-pentane | |
| C5OUT | | Ending mol fraction n-pentane | |

Kinetics

| | | | |
|---|---|---|---|
| CKCRAC | | Cracking rate constant | .2–1.0 |
| CKRATE | | Isomerization rate constant | .2–1.0 |
| RATE | | Rate of reaction | |
| RHO | | Molar density, lb-mol/ft$^3$ | |
| CKRAT | | Isomerization rate constant | |
| CKCRA | | Cracking rate constant | |
| RDEN | | Denominator for rate equation | |
| REK | | Reaction equilibrium constant | |
| TINK | | Temperature is ° K. | |
| DEN | | Denominator for rate equation | |
| RK1 | | Temp dependent rate constant | |
| RCRACK | | n-cracking reaction rate | |
| RCRAKI | | i-Cracking reaction rate | |
| CP(I) | | Index for heat-capacity of dependent variables | |
| CPT | | Heat capacity of mixture | |
| DELTAH | | Heat of reaction | |
| R | | Gas constant, psi-ft$^3$/(lb-mol)(° R) | |
| RGC | | Gas constant, J/g-mol ° K. | |
| NE | | Number of differential equations | |

Runge-Kutta Integration Constants

| | | | |
|---|---|---|---|
| CAY1(I) | | 1st constant for I = 1, NE | |
| CAY2(I) | | 2nd constant for I = 1, NE | |
| CAY3(I) | | 3rd constant for I = 1, NE | |
| CAY4(I) | | 4th constant for I = 1, NE | |

A computer is programmed to simulate pentane isomerization by calculating total pentane conversion, pentane conversion to lighter components, product ratio, $H_2$ partial pressure, and temperature across the reactor as illustrated in FIG. 5. The simulation program illustrated in FIGS. 3–4 combines cracking of $C_4$ and lighter components into a single lumped component which is referred to herein as $C_2$'s or merely as lights.

Figure 3A:
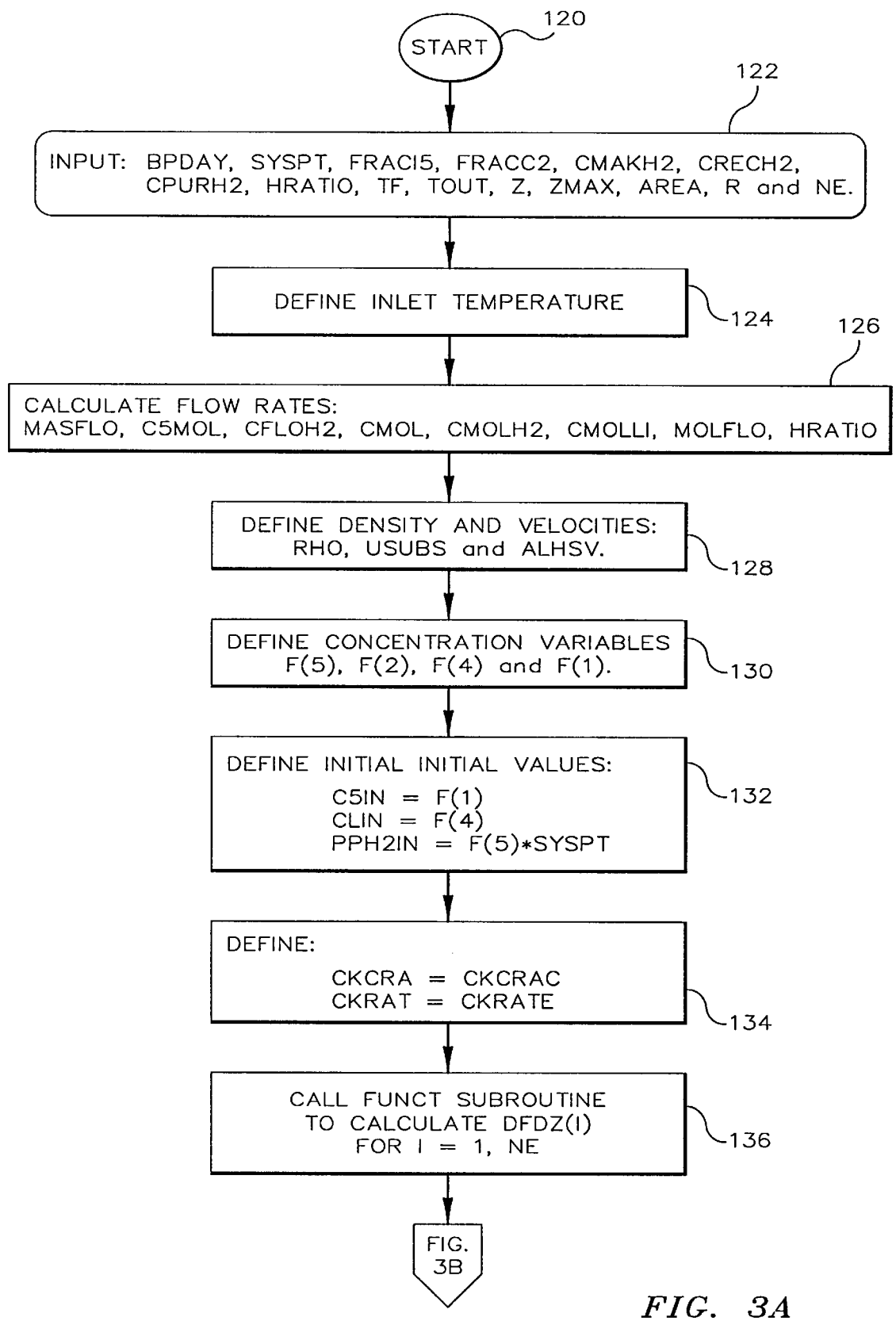
FIGS. 3A–3B is a detailed computer software flow chart for reactor simulation according to this invention.

Referring now to FIG. 3A, which illustrates simulation based on test data, the program is rendered operative at a start step 120 when desired by a user, and reads in the required initial input data shown in step 122. In a preferred embodiment a type of data entry display panel th at prompts the user to supply specific information is employed. A suitable display panel, as shown in FIG. 5, is available with the addition of an IBM program called EZ-VU II which assist the user in creating panels that a FORTRAN program can use without having to go through the lengthy process of coding everything in the program.

The program then proceeds to step 124 to equate inlet temperature of the feed TF to the temperature variable F(3).

The basic calculation for initial mass flow of $C_5$ hydrocarbon reactants illustrated in step 126 are calculated as:

MASFLO=BPDAY(219)/(24)(3600), 1bs/sec

C5MOL=MASFLO/72.15, 1b-mol/sec

Next other flow rates illustrated in step 126, which include the total flow and the $H_2$ content of the total flow in conduit 18 are calculated as follows:

CFLOH2=(CRECH2+CMAKH2)/(24)/(3600)(1000), ft$^3$/sec

CMOL=CFLOH2(0.002724), 1b-mol/sec

Finally in step 126 the total molar flow, the $C_2$ component and $H_2$ component of the reactor charge flowing in conduit 16, and the $H_2$ ratio, are calculated as follows:

MOLFLO=C5MOL+CMOL, 1b-mol/sec

CMOLH2=(CMOL)(CPURH2/100), 1b-mol/sec

CMOLLI=CMOL+(1-(CPURH2/100)+(C5MOL)(FRACC2), 1b-mol sec

HRATIO=CMOLH2/(C5MOL+(1−CPURH2/100)(CMOL))

Referring now to step 128 in FIG. 3A the following variables are defined:

RHO=SYSPT/(F(3)+459.67)(R), 1b-mol/ft$^3$

USUBS=MOLFLO/(RHO)(AREA), ft/sec

ALHSV=(BPDAY)(5.6148)/(2)(508)(24), 1b-feed/(1b-catalyst)(hr.)

Next the program proceeds to step 130 where dependent concentration variables expressed in mol-fraction are defined as follows:

(1)=(C5MOL)(1−FRACI5−FRACC2)/MOLFLO, n-pentane

F(2)=(C5MOL)(FRACTC5)/MOLFLO, i-pentane

F(4)=(CMOLLI)/MOLFLO, lights

F(5)=(CMOLH2)/MOLFLO, hydrogen

Referring now to step 132, initial values for n-pentane concentration C5IN, concentration of lights CLIN and hydrogen partial pressure PPH2IN are defined, and in step 134 parameters CKCRA and CKRAT are defined for use in subroutine FUNCT.

Figure 4:
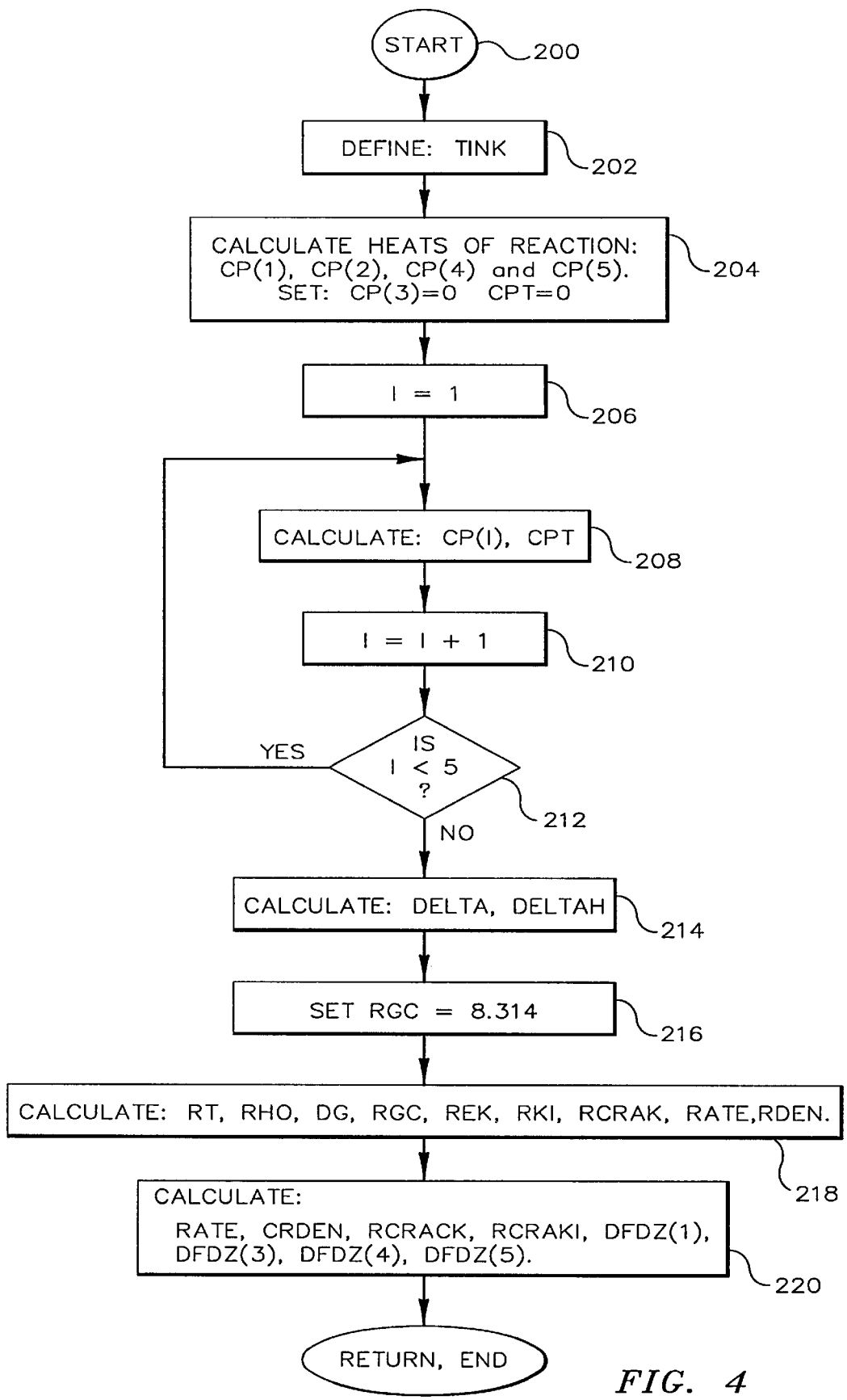
FIG. 4 is a detailed computer flowchart for a subroutine named FUNCT used in the software of FIG. 3.

The program then proceeds to step 136 to call subroutine FUNCT. This subroutine, which calculates the derivatives of F(I) with respect to the variable Z, is illustrated in FIG. 4 as will be more fully explained hereinafter.

Figure 3B:
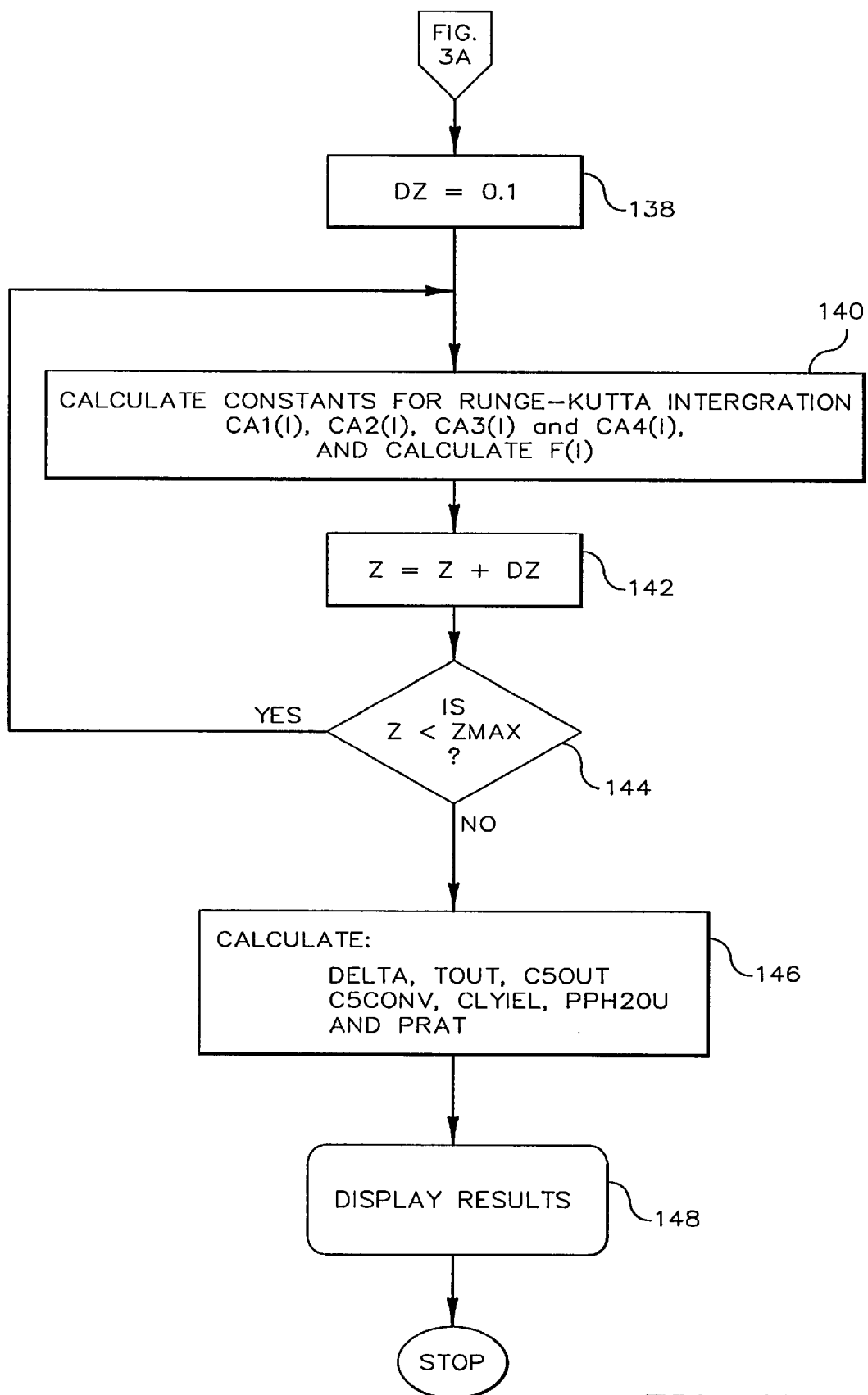

Referring now to FIG. 3B a small step size in reactor length DZ is defined in step 138 for use in numerical integration of ordinary differential equations (ODE) for F(I) by the method of Runge-Kutta (fourth order). This numerical method for solution of differential equations is well known and widely used in chemical engineering. In use the Runge-Kutta method requires four derivative evaluations per ODE at each distance step. In the program illustrated in FIGS. 3A and 3B the number of equations is 5 and the value of F(I) as calculated in step 140 is as follows:

F(I)=F(I)+DZ(CAY1(I)+(2)CAY2(I)+(2)CAY3(I)+CAY4(I))/6

In step 142 the variable reactor length is incremented by DZ and the program proceeds to a discrimination step 144 as to whether the integration has proceeded to the full length of the reactor.

On completing the integration the program evaluates each dependent equation F(I) at the reactor outlet, and calculates the values for outputting in step 146 as follows:

DELTA=F(3)−TO1

TOUT=F(3)

C5OUT=F(1)

C5CONV=(C5IN−C5OUT)(100)/(C5IN)

CLYIEL=(F(4)−CLIN)(100)/(C5IN−C5OUT)

PPH2OU=F(5)(SYSPT)

PRAT=(100)(F(2)/(F(1)+(F(2))

Referring now to FIG. 4, there is illustrated the subroutine named FUNCT that calculates derivatives of the dependent variables designated F(I) with respect to distance along the reactor. The subroutine is rendered operative at a start step 200 when called by another program, and proceeds to define a variable TINK in step 202 according to the equation:

TINK=(F(3)−32)(5)/(9)+273.15

Next in step 204 the program calculates heat capacity for n-pentane, i-pentane, lights, and hydrogen respectively according to the following equations:

CP(1)=(−0.866+(0.116)(TINK)−(6.163×10$^{-5}$)(TINK)$^2$+(1.267×10$^-$(TINK)3))(4.183)

CP(2)=(−2.275+(0.121)(TINK)−(6.51×10$^{-5}$)(TINK)$^2$+(1.367×10$^-$(TINK)$^3$))(4.183)

CP(3)=0

CP(4)=5.409+(0.178)(TINK)−(6.938×10$^{-5}$)(TINK)$^2$+(8.7/3×10$^-$)(TINK)$^3$

CP(5)=27.41+(9.274×10$^3$)(TINK)−(1.381×10$^{-5}$)(TINK)$^2$+(7.64×10$^-$)(TINK)$^3$

Next in step 206 an index I is set equal to 1 and the program proceeds to first calculate CP(I) and then CPT (heat capacity of mixture) according to the following equations in step 208:

CP(I)=CP(I)(0.2389)

CPT=CP(I)+F(I)(CP(I))

In step 210 the index in incremented by 1 and the program proceeds to step 212 to determine when five values of CP(I) have been totaled in the equation for CPT.

In step 214 DELTA and DELTAH are calculated as follows:

DELTA=(1.04)(TINK/1000)$^5$−(298/1000)$^5$,

DELTA=DELTA+(0.37)(TINK−298)

DELTAH=(8050+DELTA)(0.4299225)

The program proceeds to calculate values for a variety of terms that are used for determining rate of reaction and reaction rate constants as shown in step 218. The equations for the variables listed in step 218 are as follows:

RT=R(F(3)+459.67)

RHO=SYSPT/RT

DG=6983+(6)(TINK)

REK=(2.031/1.66)EXP(1−133511/TINK/RGC)

RK1=(2.35.×10$^6$)EXP(−101880/TINK/RGC)

RCRAK=(CKCRA)1.23×10$^5$EXP(−133511/TINK/RGC

RATE=(F(1)×(F(2)/REK))(RK1)(CKRAT)(RHO)

RDEN=F(5)+5.64(F(1)+F(2))+3.798(F(4))

In a final calculation step 220, in FIG. 4 reaction rate, isocracking and normal cracking rate constants, and the derivatives of the dependent concentration variables are calculated as follows:

RATE=RATE/RDEN

CRDEN=1+2.17(F(1)+F(2))/F(5)+2.04F(4)/F(5)

RCRACK=RCRAK(F(1))/CRDEN/F(5)

RCRAKI=0.714(RCRAK)(F(2))/CRDEN/F(5)

$$DFDZ(1) = -(RATE + 0.5(RCRACK)/(USUBS)(RHO)$$

$$DFDZ(2) = (RATE - 0.5 \; RCRAKI)/(USUBS)(RHO)$$

$$DFDZ(3) = (RATE + ((RCRACK + RCRAKI)(10))(DELTAH)/(CPT)(USUBS)(RHO)$$

$$DFDZ(4) = (RCRACK + RCRAKI)/(USUBS)(RHO)$$

$$DFDZ(5) = -3(RCRACK + RCRAKI)/8(USUBS)(RHO)$$

Results of the simulation may be displayed in the same panel as the data entry as illustrated in FIG. 5. It is noted that the simulation program tracks the conversion of n-pentane based on an isomerization rate constant and a hydrocracking constant, and further tracks the cracking of isopentane.

Figure 7:
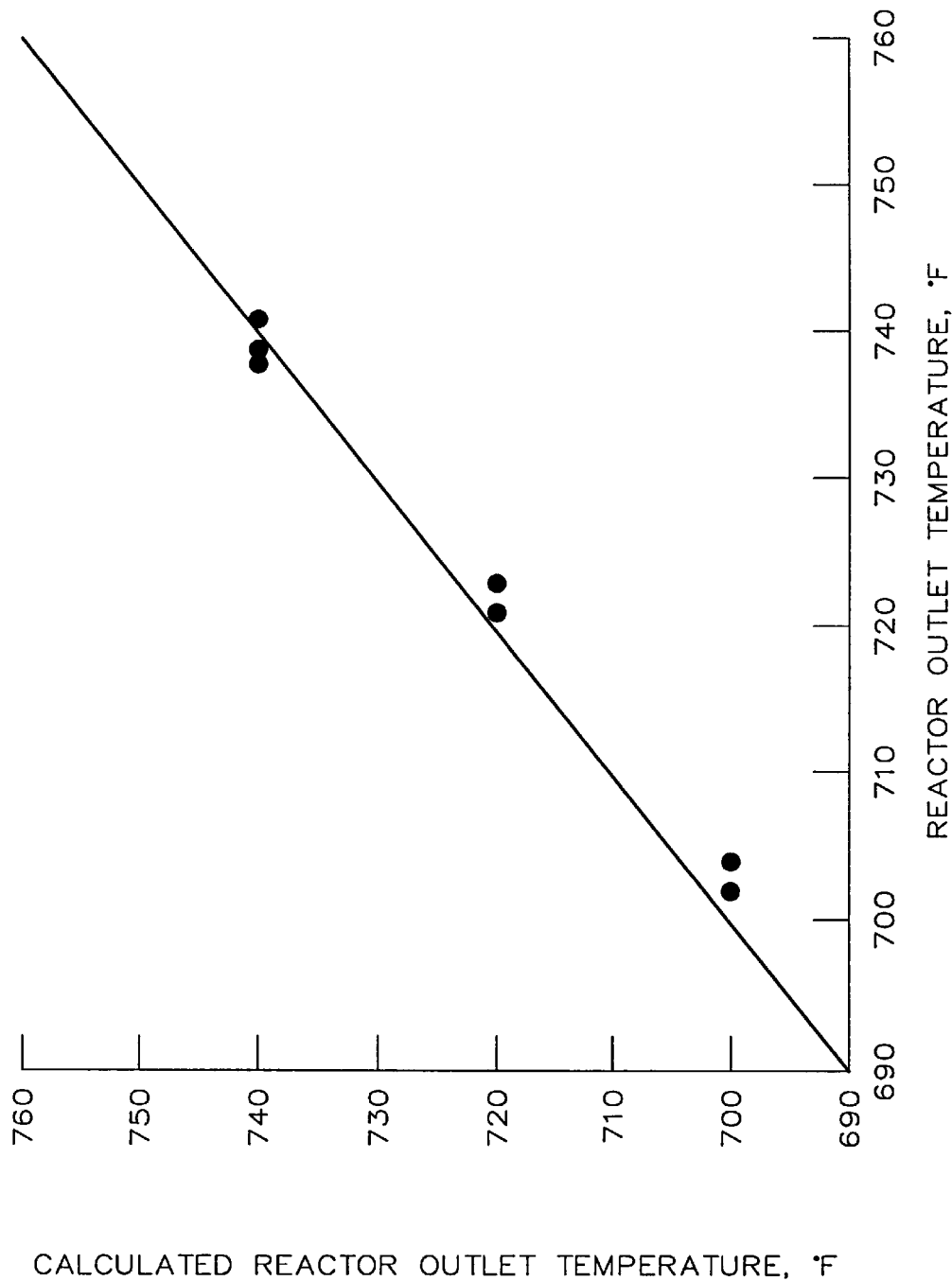
FIG. 7 is a plot comparing actual plant temperature data and computed data.
Figure 8:
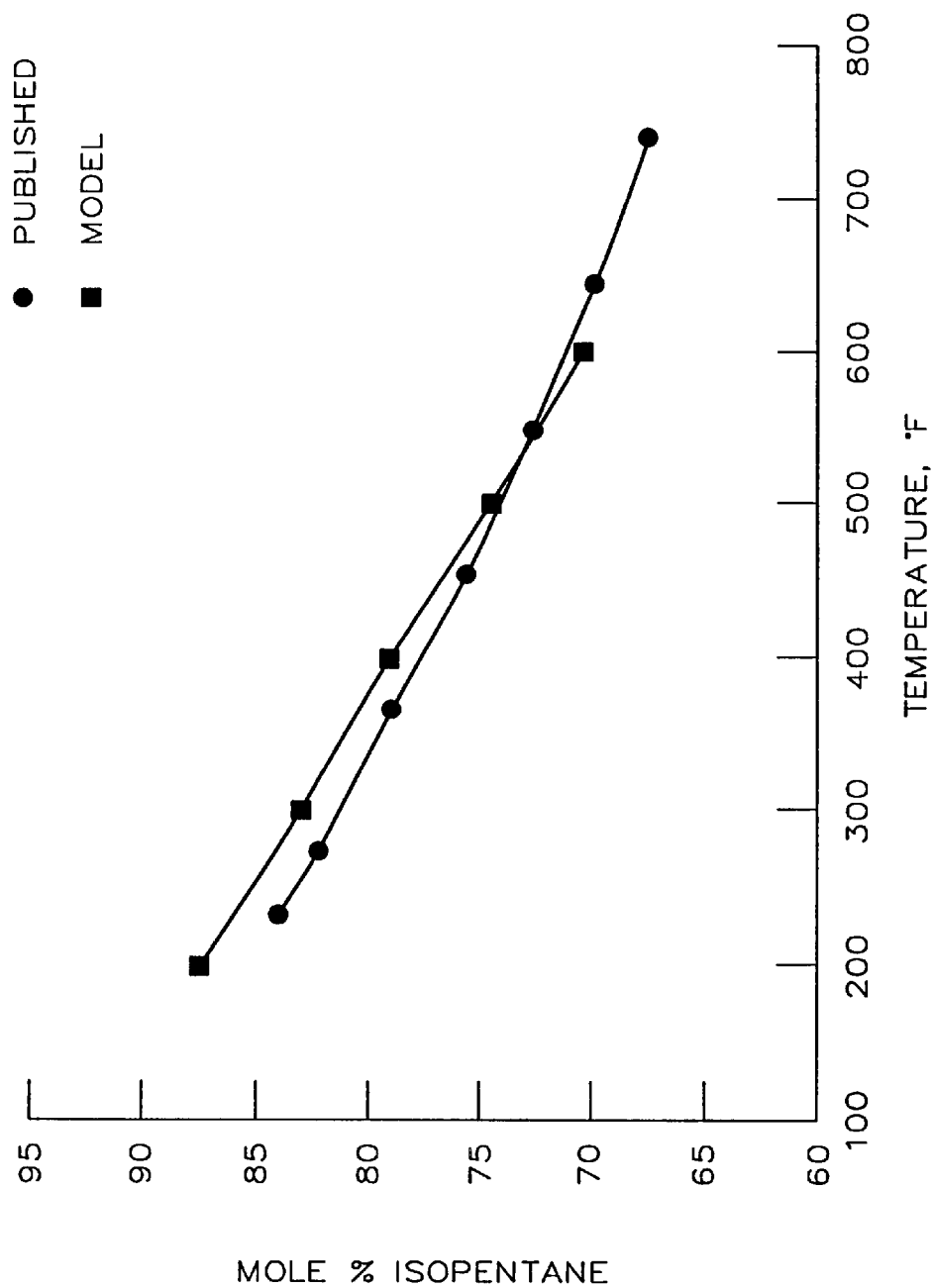
FIG. 8 is a plot comparing published isomerization data and computed data.

A plot of observed vs computed outlet temperature is shown in FIG. 7. Since the program of the present invention is generally applicable to pentane isomerization processing, a plot comparing published equilibrium data and computed data according to this invention, is shown in FIG. 8.

The invention has been described in terms of a practical steady state mathematical model for the simulation of pentane isomerization in which the predicted yield of lighter components is considered as a single lump. Reasonable variations and modifications are possible by those skilled in the art and variations and modifications such as predicting yields of $C_1$, $C_2$, $C_3$, i-$C_4$ and n-$C_4$ components is within the scope of the described invention.

That which is claimed is:

1. A method for computer simulation of pentane isomerization carried out in a tubular reactor in the presence of hydrogen, wherein a mathematical model based on a reaction mechanism for forming isopentane and hydrocracking products is stored in said computer, said method comprises the following steps:

(a) inputting actual measured data characterizing reactor input and output variables and reactant parameters into said computer for use in said model;

(b) defining at least four concentration variables and a temperature variable in terms of mole flow rates of hydrogen and hydrocarbon streams into said reactor;

(c) calculating physical properties of reactants;

(d) defining and solving differential equations for said at least four concentration variables and said temperature variable with respect to axial distance along said reactor; and (e) calculating and displaying reactor output conditions and product yields.

2. A method in accordance with claim 1 wherein reactant parameters input in step (a) include flow rates of feed and recycle streams and concentrations of isobutane and lights in said feed streams, and wherein physical properties calculated in step (c) include heat capacities, heats of formation, reaction equilibrium constants, isomerization reaction rate constants, cracking rate constants and rate of reaction.

3. A method in accordance with claim 2 wherein said four concentration variables and said temperature variable comprise:

(1) concentration of n-pentane;
   (2) concentration of i-pentane;
   (3) temperature
   (4) concentration of cracking products; and
   (5) concentration of hydrogen.

4. A method in accordance with claim 3, wherein the change in said variables recited in claim 3 with respect to axial distance along the reactor comprises:

$$DFDZ(1) = -(RATE + (0.5)RCRACK)/(USUBS)(RHO);$$

$$DFDZ(2) = (RATE - (0.5)RCRAKI)/(USUBS)(RHO);$$

$$DFDZ(3) = (RATE + (10)(RCRACK + RCRAKI))(DELTAH)/(CPT)(USUBS)(RHO);$$

$$DFDZ(4) = (RCRACK + RCRAKI)/(USUBS)(RHO)$$

$$DFDZ(5) = -(3)(RCRACK + RCRAKI/(8)(USUBS)(RHO)$$

where:

RATE is rate of reaction,

RCRACK is n-cracking reaction rate,

RCRAKI is i-cracking reaction rate

USUBS is superficial velocity,

RHO is molar density, and

CPT is heat capacity of reaction mixture.

5. A method in accordance with claim 1, wherein said step (a) for inputting data comprises using a data entry panel that prompts the user to supply specific information.

6. A method in accordance with claim 1, wherein said reactor outputs and product yields are displayed on a screen panel as follows:

i. outlet temperature, ii. temperature across the reactor, iii. total n-pentane conversion, iv. n-pentane conversion to lights, v. hydrogen partial pressure, and vi. product ratio.

7. A method using a computer for simulating results from operation of: a reactor which yields an isomerization product formed in the presence of a catalyst contained in said reactor; and means for contacting a reactants feedstream comprising n-pentane with said catalyst in the presence of hydrogen under isomerization conditions to yield said product, said method comprising:

(a) storing a mathematical model in said computer, said model describing a reaction mechanism for forming isopentane in the presence of said catalyst in said isomerization reactor;

(b) receiving measurement data in said computer for use in said model, said measurement data including at least actual input and output operating variables for said isomerization reactor, and flow rates and composition of said feedstream;

(c) determining isomerization rate and cracking rate constants based on said measurement data for calibrating said model;

(d) receiving test data in said computer, said test data comprising initial values for variables corresponding to said measurement data;

(e) using said isomerization rate constants, said cracking rate constants determined in step (c) and said test data received in step (d) with said model for determining product yield and reactor conditions, and (f) displaying product yield and reactor conditions based on said test data.

8. A method in accordance with claim 7, wherein said reactor outputs and product yields are displayed on a screen panel as follows:

i. outlet temperature, ii. temperature across the reactor, iii. total n-pentane conversion, iv. n-pentane conversion to lights, v. hydrogen partial pressure, and vi. product ratio.

9. A method in accordance with claim 7, wherein said step of describing a reaction mechanism includes defining at least four concentration variables and a temperature variable in terms of mole flow rates of hydrogen and n-pentane streams into said reactor.

10. A method in accordance with claim 9, wherein said four concentration variables and said temperature variable comprise:
   (1) concentration of n-pentane;
   (2) concentration of i-pentane;
   (3) temperature
   (4) concentration of cracking products; and
   (5) concentration of hydrogen.

11. A method in accordance with claim 10, wherein the change in said variables recited in claim 9 with respect to axial distance along the reactor comprises:

$$DFDZ(1)=-(RATE+(0.5)RCRACK)/(USUBS)(RHO);$$

$$DFDZ(2)=(RATE-(0.5)RCRAKI)/(USUBS)(RHO);$$

$$DFDZ(3)=(RATE+(10)(RCRACK+RCRAKI))(DELTAH)/(CPT)(USUBS)(RHO);$$

$$DFDZ(4)=(RCRACK+RCRAKI)/(USUBS)(RHO)$$

$$DFDZ(5)=-(3)(RCRACK+RCRAKI/(8)(USUBS)(RHO)$$

where:
   RATE is rate of reaction,
   RCRACK is n-cracking reaction rate,
   RCRAKI is i-cracking reaction rate
   USUBS is superficial velocity,
   RHO is molar density, and
   CPT is heat capacity of reaction mixture.

12. A method in accordance with claim 11, wherein said step (a) for inputting data comprises using a data entry panel that prompts the user to supply specific information.

13. A method in accordance with claim 9 additionally comprising:
   calculating physical properties of reactants in said feedstream; and
   defining and solving differential equations for said at least four concentration variables and said temperature variable with respect to axial distance along said reactor.

14. A method in accordance with claim 13, wherein said physical properties of said feedstream include;
   heat of reaction;
   heat of formation; and
   reaction equilibrium constants.

15. Apparatus for simulating an isomerization reaction in which the simulation predicts results of n-pentane isomerization reaction, said apparatus comprising:
   an isomerization reactor;
   conduit means for supplying a feedstream comprising n-pentane to said isomerization reactor;
   means for withdrawing a product stream comprising isopentane from said isomerization reactor;
   means for obtaining measurement data including at least input and output operating variables for said isomerization reactor, and flow rates and compositions of said feedstream;
   a computer programmed for:
      storing a mathematical model, said model describing a reaction mechanism for forming isopentane in a catalytic reaction carried out in said isomerization reactor;
      receiving said measurement data for use in said model;
      determining isomerization rate and cracking rate constants based on said measurement data for calibrating said model;
      receiving test data for use in said model, said test data comprising initial values for variables corresponding to said measurement data;
      using said model, said isomerization rate constants, said cracking rate constants and said test data, for determining product yield and reactor conditions; and
      displaying product yield and reactor conditions based on said test data.

16. Apparatus in accordance with claim 15 wherein said measurement data comprises:
   volume of hydrocarbon charge flow;
   total system pressure;
   mole fraction of i-pentane in feed;
   mole fraction of lights in feed;
   volume flow of make-up hydrogen;
   volume flow of recycle hydrogen;
   purity of hydrogen in hydrogen feed;
   ratio mole hydrogen/mole n-pentane is charge flow;
   temperature of feed;
   outlet temperature;
   reactor length; and
   reactor area.

17. Apparatus in accordance with claim 15 wherein said reaction mechanism for forming isopentane includes defining at least four concentration variables and a temperature variable in terms of mole flow rates of hydrogen and n-pentane streams into said reactor.

* * * * *